(12) United States Patent
Shao et al.

(10) Patent No.: US 10,901,652 B2
(45) Date of Patent: Jan. 26, 2021

(54) HEAT VALUE TRACKING

(71) Applicant: International Business Machines Corporation, Armonk, NY (US)

(72) Inventors: Feng Shao, Shanghai (CN); Yicheng Feng, Shanghai (CN); Gang Lyu, Shanghai (CN); Si Cong Zhou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/396,995

(22) Filed: Apr. 29, 2019

(65) Prior Publication Data

US 2020/0341677 A1  Oct. 29, 2020

(51) Int. Cl.
*G06F 3/06* (2006.01)

(52) U.S. Cl.
CPC .......... *G06F 3/0653* (2013.01); *G06F 3/0604* (2013.01); *G06F 3/0647* (2013.01); *G06F 3/0673* (2013.01)

(58) Field of Classification Search
CPC ..... G06F 3/0653; G06F 3/0647; G06F 3/0685
See application file for complete search history.

(56) References Cited

U.S. PATENT DOCUMENTS

| | | |
|---|---|---|
| 8,583,838 B1 | 11/2013 | Marshak et al. |
| 9,785,353 B1 | 10/2017 | Marshak et al. |
| 9,940,024 B1 | 4/2018 | Aharoni et al. |
| 10,042,578 B2 | 8/2018 | Karve et al. |
| 10,095,416 B2 | 10/2018 | Zhou |
| 2018/0136838 A1* | 5/2018 | White ............... G06F 3/0647 |
| 2018/0232158 A1 | 8/2018 | Fang et al. |

OTHER PUBLICATIONS

Mell et al., "The NIST Definition of Cloud Computing", Recommendations of the National Institute of Standards and Technology, Sep. 2011, 7 pages.

\* cited by examiner

*Primary Examiner* — Edward J Dudek, Jr.
(74) *Attorney, Agent, or Firm* — Donald J. O'Brien

(57) ABSTRACT

This disclosure relates to a method, a system and a computer program product for tracking heat values. The method includes monitoring a first number of access operations to first data in each of a plurality of first source storage units during a cycle. The method further includes, for each of the plurality of first source storage units, calculating a first heat value based on the first number of access operations. Additionally, the method includes, in response to source data being moved from one of the first source storage units to a first target storage unit during the cycle, decreasing a calculated heat value of the one first source storage unit by a first value and increasing a calculated heat value of the first target storage unit by the first value.

17 Claims, 8 Drawing Sheets

HEAT VALUE TRACKING

BACKGROUND

The present disclosure relates to data storage, and more specifically, to a method, a system and a computer program product for tracking heat values.

In a multiple-tier data store, tracking input/output (I/O) heat values of storage units such as extents is useful for the storage tiering technology. Heat values can represent the frequency with which the data in the storage units is accessed. With this tracking, a storage controller can recognize hot extents with high heat values and place them on a high-performance drive such as a flash drive and recognize cold extents with low heat values and place them on a low performance drive such as a hard disk drive, so that hosts can obtain efficient performance. In other words, heat values are used as reference for placing storage units for which the heat values are recorded onto drives with different performances.

SUMMARY

According to some embodiments of the present disclosure, there is provided a method for tracking heat values. The method includes monitoring a first number of access operations to first data in each of a plurality of first source storage units during a cycle. The method further includes, for each of the plurality of first source storage units, calculating a first heat value based on the first number of access operations. Additionally, the method includes, in response to source data being moved from one of the first source storage units to a first target storage unit during the cycle, decreasing a calculated heat value of the one first source storage unit by a first value and increasing a calculated heat value of the first target storage unit by the first value.

According to another embodiment of the present disclosure, there is provided a system for tracking heat values. The system comprises one or more processors and a memory coupled to at least one of the one or more processors. The system further comprises a set of computer program instructions stored in the memory and executed by at least one of the one or more processors in order to perform a method. The method includes monitoring a first number of access operations to first data in each of a plurality of first source storage units during a cycle. The method further includes, for each of the plurality of first source storage units, calculating a first heat value based on the first number of access operations. Additionally, the method includes, in response to source data being moved from one of the first source storage units to a first target storage unit during the cycle, decreasing a calculated heat value of the one first source storage unit by a first value and increasing a calculated heat value of the first target storage unit by the first value.

According to a further embodiment of the present disclosure, there is provided a computer program product for tracking heat values. The computer program product comprising a computer readable storage medium having program instructions embodied therewith. The program instructions being executable by a device to cause the device to perform a method. The method includes monitoring a first number of access operations to first data in each of a plurality of first source storage units during a cycle. The method further includes, for each of the plurality of first source storage units, calculating a first heat value based on the first number of access operations. Additionally, the method includes, in response to source data being moved from one of the first source storage units to a first target storage unit during the cycle, decreasing a calculated heat value of the one first source storage unit by a first value and increasing a calculated heat value of the first target storage unit by the first value.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

Figure 1:
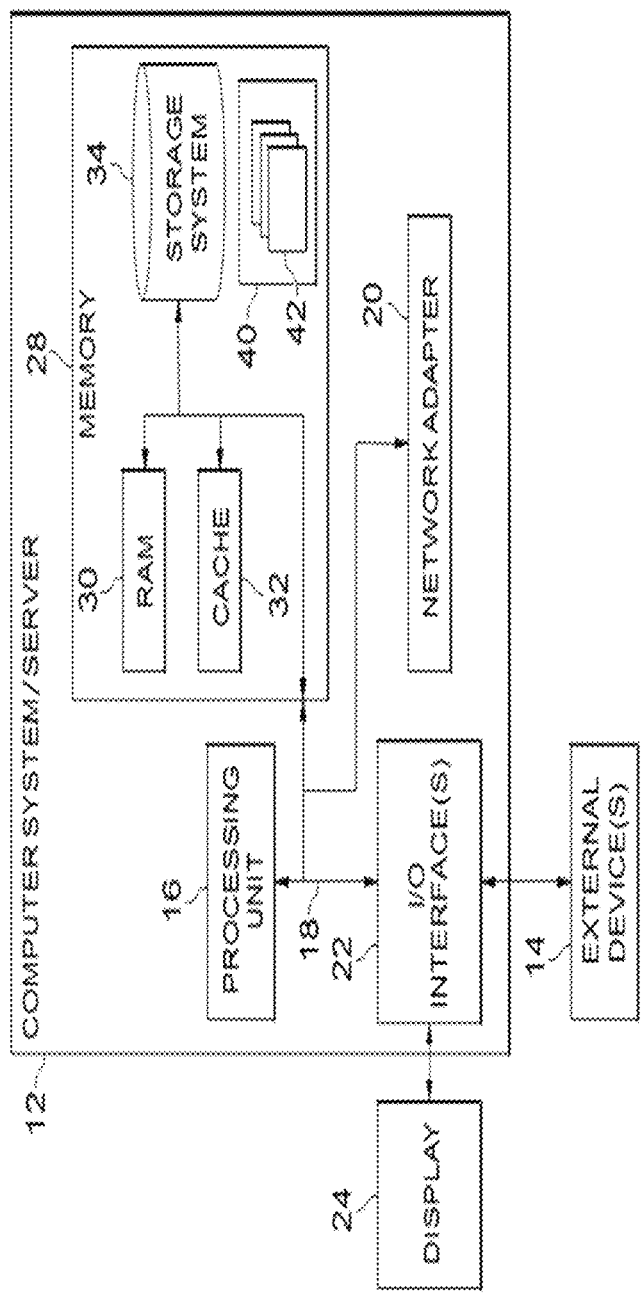
FIG. 1 depicts a cloud computing node according to some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

In a data store, data can be organized in multiple granularities. In one example, data can be organized in extents and chunks, wherein an extent can include a plurality of chunks. For example, in one implementation, the size of an extent can be 16 MB to 8 GB, and the size of a chunk can be 8192 KB. Additionally, a mapping between the logical blocks used with logical addresses and the physical chunks is maintained in the data store, which is a part of metadata of the data store. However, this mapping can change as a result of write operations or garbage collection. For example, when a write operation happens to a logical address of a volume, the new data may not overwrite the data at the original physical address (i.e., the original chunk). Instead, the new data might be written to a new physical address (i.e., a new chunk). The new chunk thus may not be located in the same extent as the original chunk. That is, in this case, data in the original chunk and its heat can be moved from one extent to another extent. Additionally, during garbage collection, the storage controller can delete chunks that are no longer in use. Thus, if all the chunks within an extent are deleted, garbage collection may create empty extents. However, in order to make efficient use of data storage, the storage controller can also move chunks out of sparsely populated extents and pack these chunks more densely into otherwise empty extents. In this way, garbage collection can cause data, e.g., customer data, to move between extents.

Accordingly, the heat associated with the moved chunks can also be moved between extents.

However, the size of the moved data, e.g., the chunk, is smaller than the size of an extent. Further, current storage tiering technology records heat values at the extent level. As such, current storage tiering technology may not consider how the movement of data in or out of an extent can influence the heat values of the affected extents. Thus, in current systems, the heat value of an extent, where chunks may be moved in or out, may not reflect the actual heat value of the chunks within the extent.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is merely an example of a cloud computing node and is not intended to suggest any limitation as to the scope of use or functionality of embodiments of the present disclosure described herein. Regardless, cloud computing node 10 is capable of being implemented and/or performing any of the functionality set forth herein.

In cloud computing node 10 there is a computer system/server 12 or a portable electronic device such as a communication device, which is operational with numerous other general purpose or special purpose computing system environments or configurations. Examples of well-known computing systems, environments, and/or configurations that can be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 can be described in the general context of computer system-executable instructions, such as program modules, being executed by a computer system. Generally, program modules can include routines, programs, objects, components, logic, data structures, and so on that perform particular tasks or implement particular abstract data types. Computer system/server 12 can be practiced in distributed cloud computing environments where tasks are performed by remote processing devices that are linked through a communications network. In a distributed cloud computing environment, program modules can be located in both local and remote computer system storage media including memory storage devices.

The computer system/server 12 of cloud computing node 10 is shown in the form of a general-purpose computing device. The components of computer system/server 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 can include a variety of computer system readable media. Such media can be any available media that is accessible by computer system/server 12, and can include volatile and/or non-volatile media, which can be removable and/or non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program modules that are configured to carry out the functions of embodiments of the present disclosure.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the present disclosure as described herein.

Computer system/server 12 can also communicate with one or more external devices 14 such as a keyboard and/or a pointing device. Additionally, the computer system/server can communicate with a display 24. The external devices 14 and display 124 can include one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
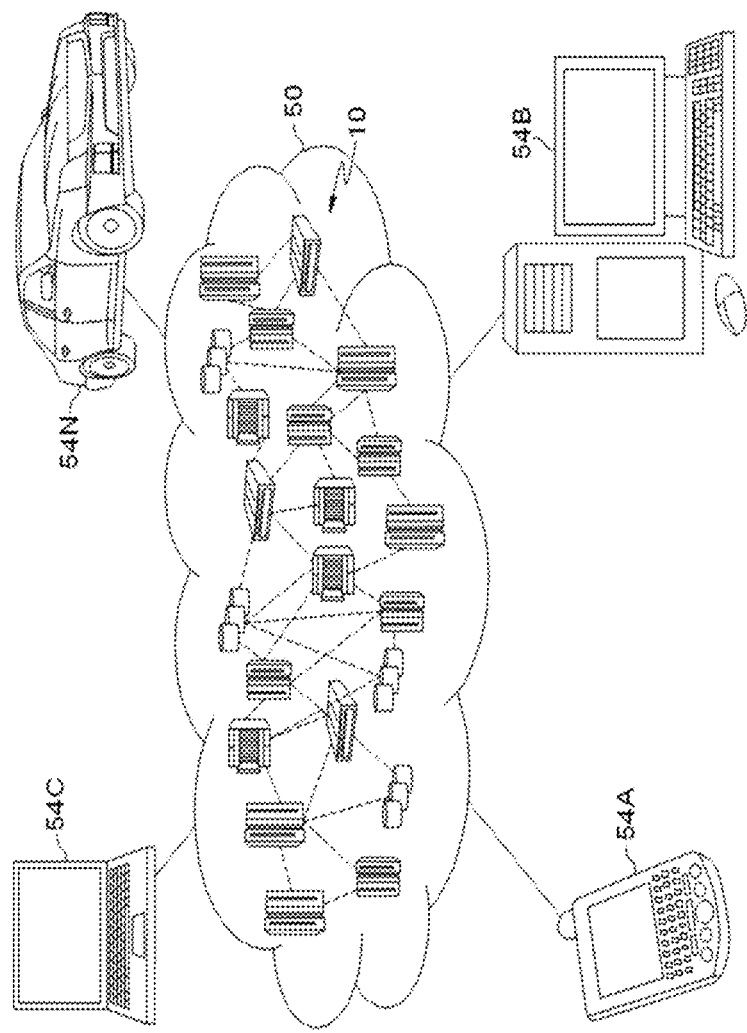
FIG. 2 depicts a cloud computing environment according to some embodiments of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
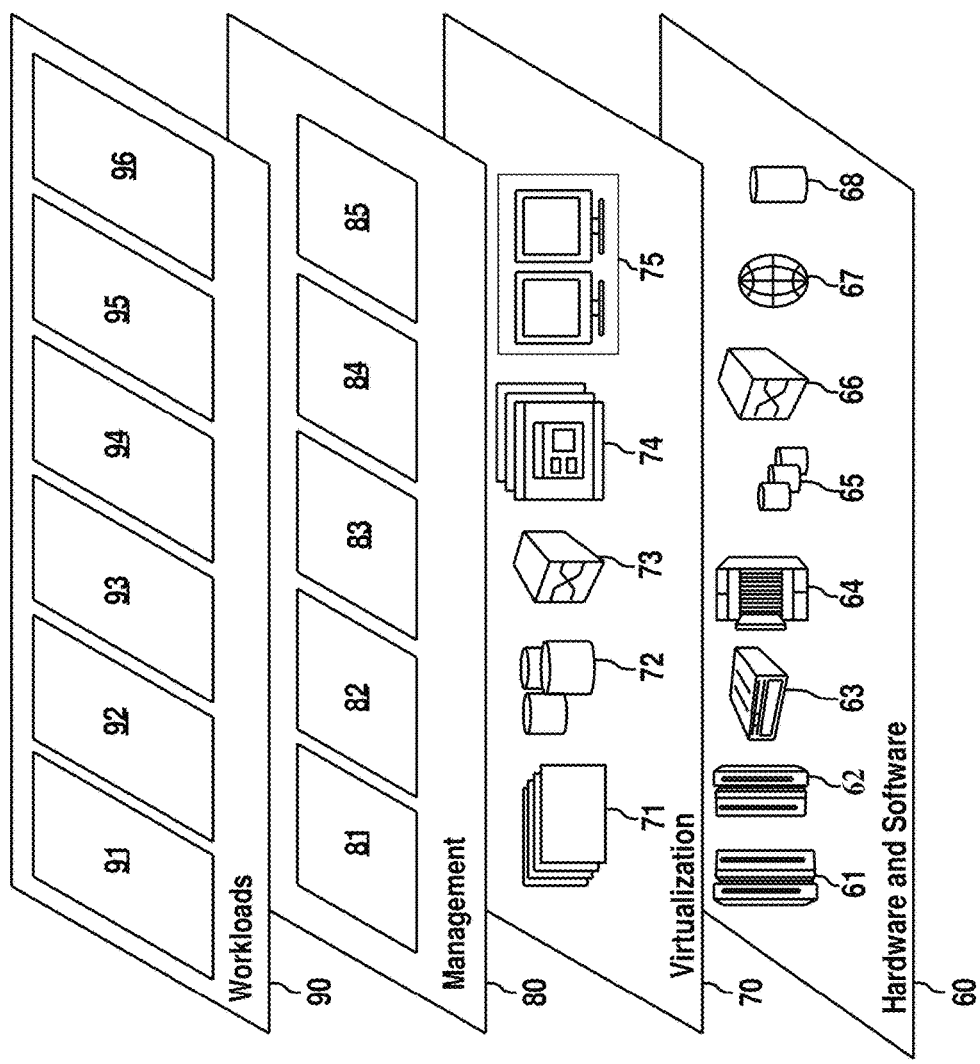
FIG. 3 depicts abstraction model layers according to some embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the present disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and heat value tracking 96.

As described above, due to the movement of customer data and heat between extents, and the size of moved data being smaller than the size of an extent, storage tiering may become inefficient. Another possible approach to storage tiering could be to record heat values at the granularity of chunks, and move the chunks between various storage tiers based on the recorded heat values. However, because the size of a chunk can be smaller than an extent, the amount of memory for recording heat values at the level of chunks can be much greater than that for recording heat level at the level of extents. Also, with a larger number of chunks than extents, the cost of the CPU resources for sorting and searching can increase significantly.

Accordingly, instead of tracking heat values at the level of chunks, embodiments of the present disclosure can adjust the heat values of extents when chunks of data are moved across extents. It should be noted that, while data granularities are described in terms of extents and chunks, embodiments of the present disclosure can be applicable to other granularities, including any cases in which there are two different storage units in a data store, heat values are recorded at the level of the larger storage unit, and the smaller storage units are moved across the larger storage units. In one example, the larger storage unit is an extent and the smaller storage unit is a chunk. In another example, the larger storage unit is a set of extents and the smaller storage unit is an extent. In a further example, the larger storage unit is a chunk and the smaller storage unit is a unit smaller than a chunk. The above examples are not exhaustive, and there are other implementations to which the present disclosure can be applied.

The storage tiering technology works on a cyclical basis. For example, each cycle can be 5 minutes. Of course, the cycle can be set to other time durations. In each cycle, the storage tiering technology records the heat value of an extent during the cycle, which is called "cycle heat." After a cycle, this heat value of the cycle is used to update a historical heat value of the extent, which is called "historical heat," using a method such as exponential moving average (EMA). Additionally, the updated historical heat can be used to determine whether this extent is hot, warm, or cold. Embodiments of the present disclosure can adjust the cycle heat. Alternative embodiment of the present disclosure can also adjust the historical heat.

Figure 4:
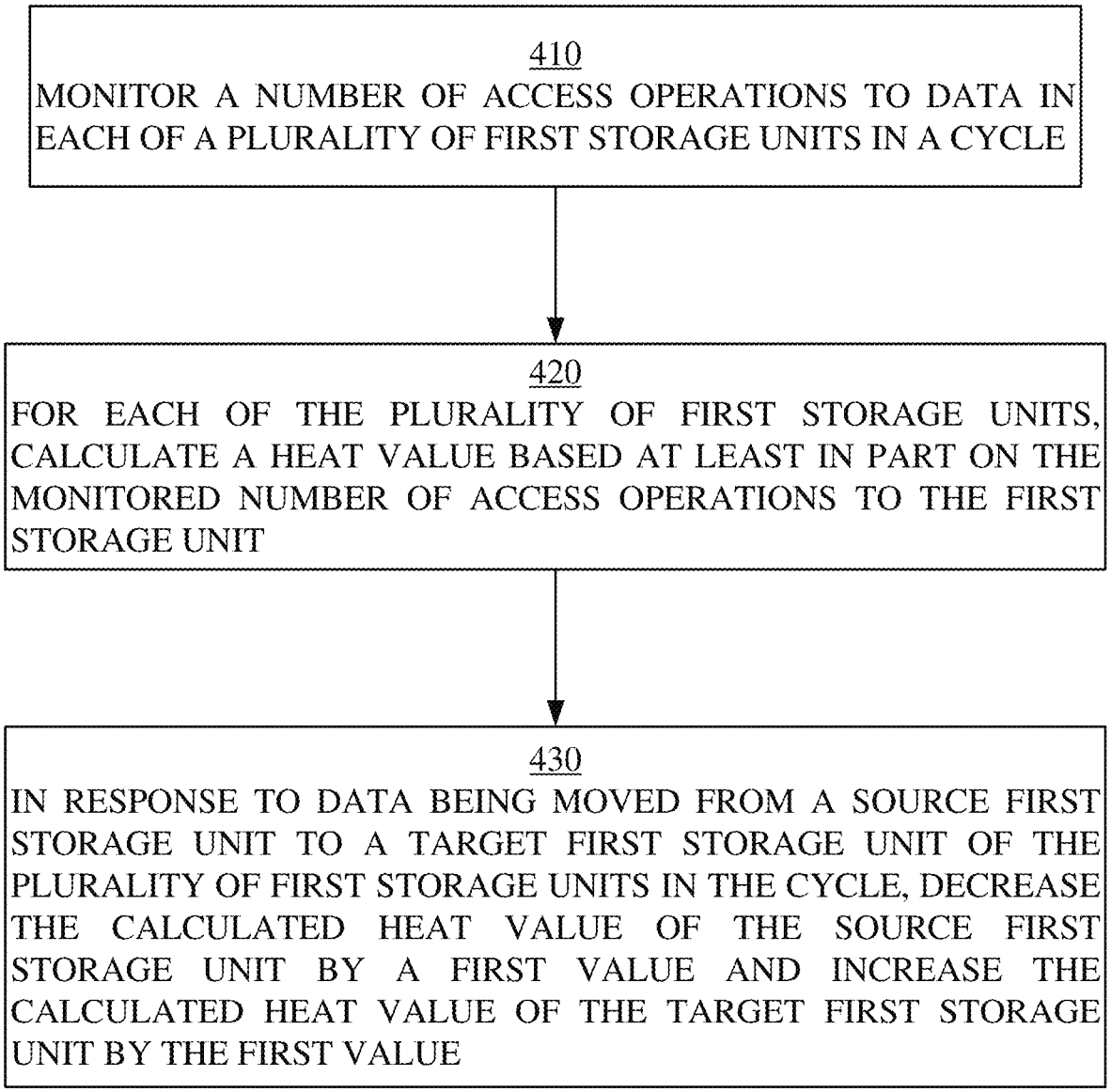
FIG. 4 shows a block diagram of a flowchart illustrating an example method for heat value tracking according to some embodiments of the present disclosure.

With reference now to FIG. 4, which is a flowchart illustrating an exemplary method 400 for heat value tracking according to some embodiments of the present disclosure. The method 400 may be performed by computer system/server 12 of FIG. 1.

As shown in FIG. 4, at step 410, a number of access operations to data in each of a plurality of first storage units can be monitored during a cycle. Here, in some embodiments, the first storage unit can be an extent. The monitored number of access operations can be stored in a field added to metadata of the extent. The number of access operations can be monitored in real time from the start of the cycle. In other words, the number of access operations can be set to 0 at the start of the cycle. Whenever an access operation happens to the first storage unit, the number of access operations can be increased by one.

At step 420, for each of the plurality of first storage units, a heat value can be calculated based at least in part on the monitored number of access operations to the first storage unit. Besides the monitored number of access operations to the first storage unit, the calculation of the heat value can also consider one or more of the following elements: size of the accessed data, response time of these access operations, and the like. To simplify the explanation of the present disclosure, in the following examples it is assumed that the heat value of a storage unit has a linear relationship with the number of access operations to the storage unit.

At step 430, in response to data being moved from a source first storage unit to a target first storage unit of the plurality of first storage units during the cycle, the calculated heat value of the source first storage unit can be decreased by a first value. Additionally, the calculated heat value of the target first storage unit can be increased by the first value. In this way, when data is moved from one storage unit to another storage unit, the associated heat (that is caused by access operations to it) can also be moved with the data. In some embodiments of the disclosure, a ratio of the first value to the heat value of the source first storage unit can be equal to a ratio of the size of the moved data to the size of the source first storage unit. For example, if the heat value of the source first storage unit is 1000, and one tenth of data in the source first storage unit is moved to the target first storage unit, the heat value of the source first storage unit can be decreased by 1000*(1/10)=100, and the heat value of the target first storage unit can be increased by 100.

In some embodiments of the disclosure, the data can be moved from the source first storage unit to the target first storage unit in a second storage unit that is smaller than the first storage unit. That is, the size of the moved data is smaller than the size of the data for which heat values are recorded. In some embodiments of the disclosure, the second storage unit can be a chunk. In some embodiments of the disclosure, a chunk can be moved between extents in the same tier of a multiple-tier data store. In another embodiment of the disclosure, a chunk can be moved between extents in different tiers of the multiple-tier data store.

However, in some cases, heat may not be evenly distributed among chunks in an extent. The above method may not work well in this case. To address this concern, in some embodiments of the disclosure, the method in FIG. 4 can further comprise: monitoring a number of access operations to data in each second storage unit in each of the plurality of first storage units during the cycle. This means that, in the case that the second storage unit is a chunk, the number of access operations to data in each chunk can also be monitored. The monitored number of access operations can be stored in a field added to the metadata of the chunk.

In the case the number of access operations to data in each second storage unit is also monitored, the first value can be determined in the following way: a ratio of the first value for the calculated heat value of the source first storage unit can be equal to a ratio of a monitored number of access operations to data that is moved to a monitored number of access operations to data in the source first storage unit during the cycle.

In such an embodiment, with the movement of data, the number of access operations can also be moved from the source first storage unit to the target first storage unit. The method in FIG. 4 can further comprise: in response to data being moved from a source first storage unit to a target first storage unit of the plurality of first storage units during the cycle, decreasing the monitored number of access operations to data in the source first storage unit by a number that is equal to the monitored number of access operations to data that is to be moved. Additionally, a monitored number of access operations to data in the target first storage unit can be increased by the number. That is, as data in a chunk is moved from the source extent to the target extent, the number of access operations to the chunk is subtracted from the monitored number of access operations to the source extent and added to the monitored number of access operations to the target extent.

Figure 5A:
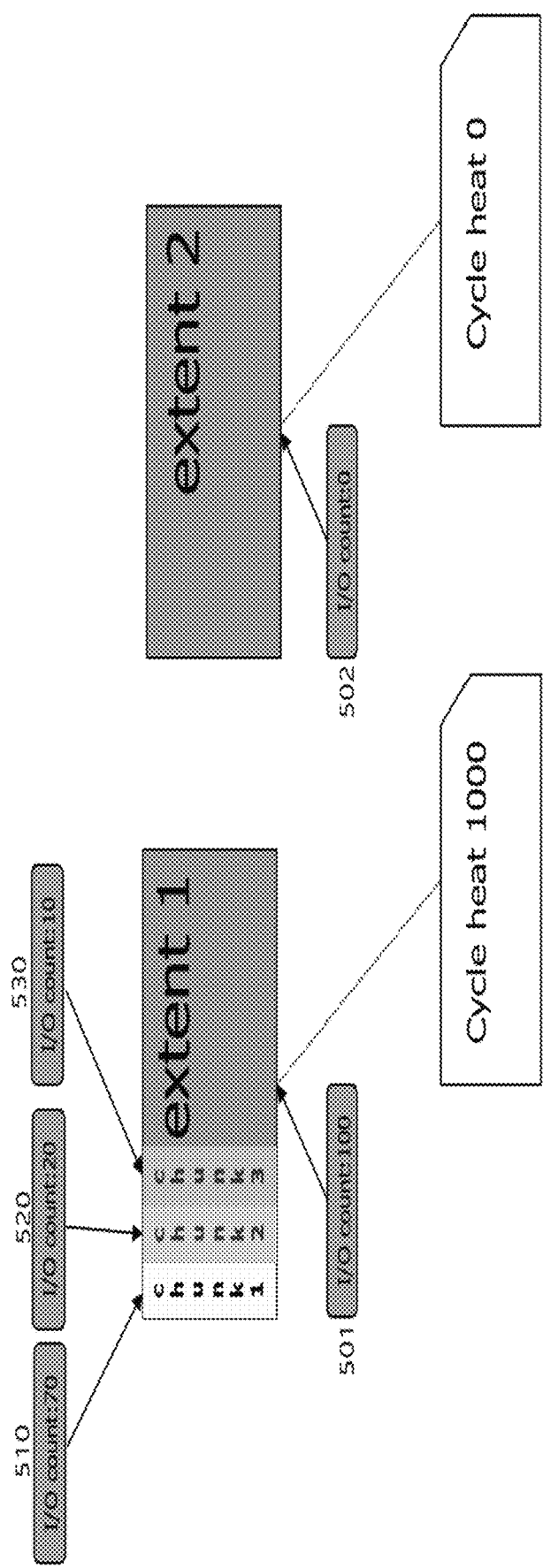
FIGS. 5A-5B show an example of adjusting cycle heat of extents in response to data movement according to some embodiments of the present disclosure.
Figure 5B:
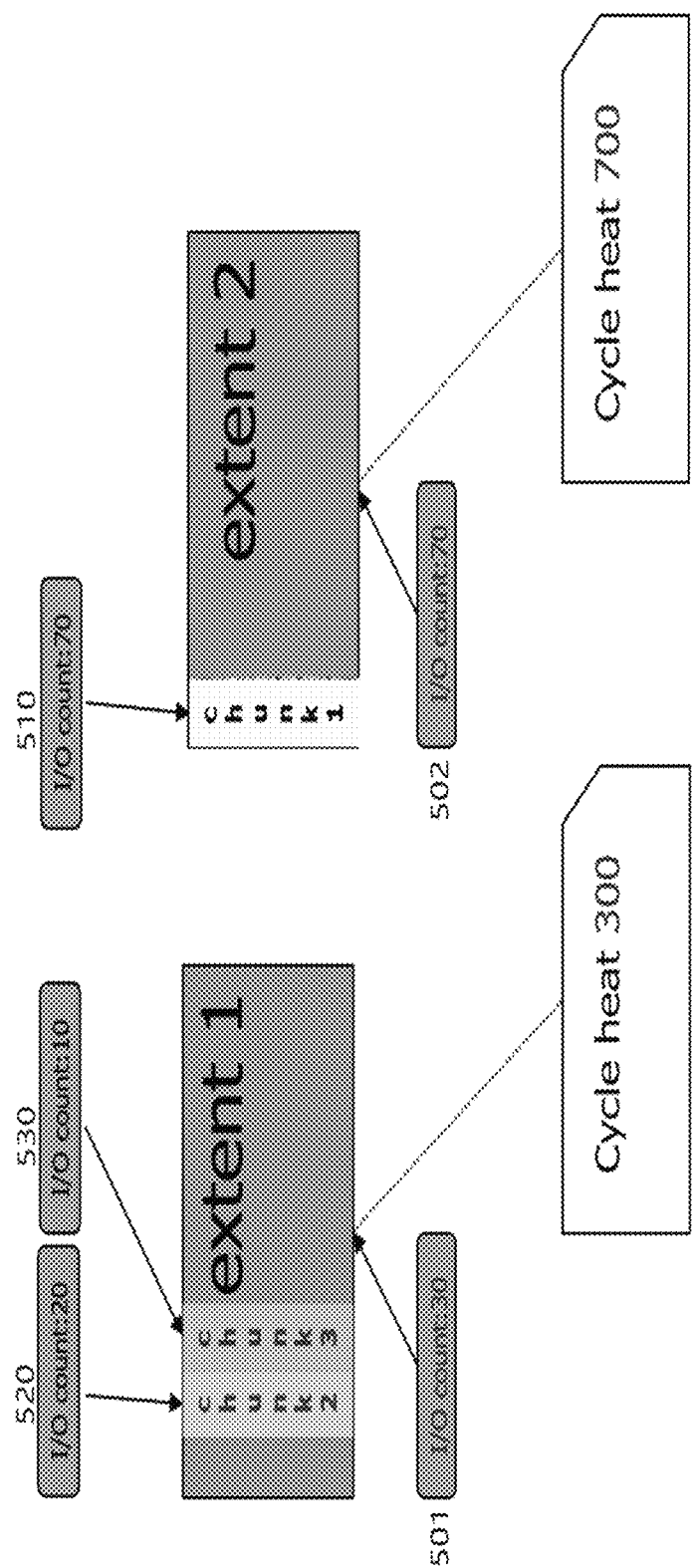

FIGS. 5A-5B show an example of adjusting cycle heat of extents in response to data movement according to some embodiments of the present disclosure. In FIG. 5A, two extents, i.e., extent 1 and extent 2, are shown. For each of the extents, an "I/O count" field (501, 502) is used to record the monitored number of access operations to a respective extent. For each of the chunks, an "I/O count" field (510, 520, 530) is used to record the monitored number of access operations to a respective chunk. At the start of each cycle, the "I/O count" fields in a chunk's metadata are reset to 0 for every chunk, and the "I/O count" fields in an extent's metadata are reset to 0 for every extent. For every access (i.e., I/O) operation to a chunk, the "I/O count" field in the chunk's metadata is increased by 1, and the "I/O count" field in the extent's metadata is also increased by 1. In FIG. 5A, at a moment, the "I/O count" 510 is 70, which means there are 70 access operations to chunk 1 since the start of the cycle; the "I/O count" 520 is 20, which means there are 20 access operations to chunk 2 since the start of the cycle; and the "I/O count" 530 is 10, which means there are 10 access operations to chunk 3 since the start of the cycle. The number of access operations to a chunk is also counted to the number of access operations to an extent to which the chunk belongs. Thus, the "I/O count" 501 for extent 1 is 100. It is assumed that no data in extent 2 is accessed since the start of the cycle. So, the "I/O count" 502 for extent 2 is zero. The cycle heat of extent 1 is calculated based on the "I/O count" 501. Here, it is assumed that there is a simple multiple relationship between the "I/O count" 501 and the cycle heat, such as 10 times the number of access operations. Accordingly, the cycle heat for extent 1 is 1000 and the cycle heat for extent 2 is zero.

FIG. 5B shows a case in which data in chunk 1 has been moved from extent 1 to extent 2 due to some reason such as, for example, a write operation or a garbage collection. Whenever data is moved from a source chunk to a target chunk in another extent, the method can be executed.

Accordingly, the heat value for chunk 1 is subtracted from the cycle heat for extent 1 and added to the cycle heat for extent 2. In some embodiments of the disclosure, the first value can be calculated as (cycle heat value of source extent)*("I/O count" of moved chunk/"I/O count" of source extent). For the example in FIG. 5B, the heat value for chunk 1 is =1000*(70/100)=700. Thus, the cycle heat of extent 1 is decreased by 700 and the cycle heat of extent 2 is increased by 700. The updated cycle heats are shown in FIG. 5B. Additionally, with data in chunk 1 being moved from extent 1 to extent 2, the "I/O count" 501 of extent 1 is accordingly decreased by the "I/O count" 510 of chunk 1 and set to 30, and the "I/O count" 502 of extent 2 is accordingly increased by the "I/O count" 510 of chunk 1 and set to 70. Further, access operations to extent 1 and extent 2 continue to be monitored to update these "I/O count" fields until a next chunk movement occurs.

In some embodiments of the disclosure, historical heat of the source first storage unit can also be adjusted in response to data being moved to the target first storage unit. In some embodiments of the disclosure, at the end of the cycle, if data has been moved from the source first storage unit to the target first storage unit, a stored historical heat value of the source first storage unit can be decreased by a second value and a stored historical heat value of the target first storage unit can be increased by the second value. The second value can be determined in the following way: at the end of the cycle, a ratio of the second value to the stored historical heat value of the source first storage unit is equal to a ratio of a monitored number of access operations to data that has been moved to the target first storage unit during the cycle to a sum of a monitored number of access operations to data in the source first storage unit and the monitored number of access operations to data that has been moved to the target first storage unit during the cycle.

Figure 6A:
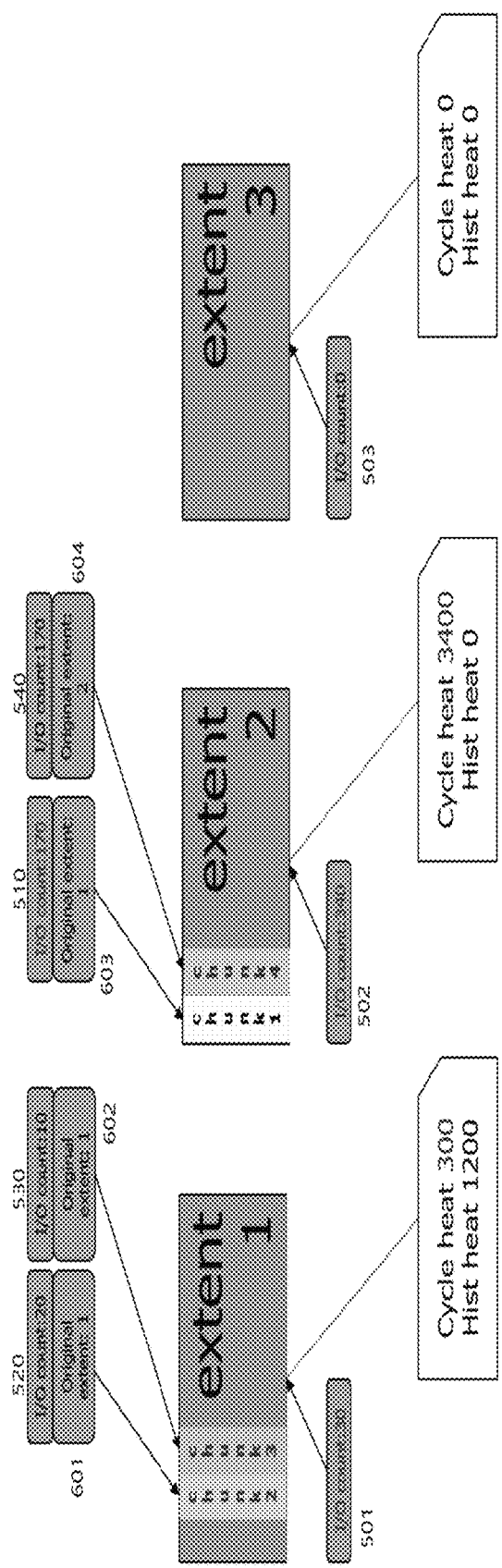
FIGS. 6A-6B show an example of multiple movements of a chunk during a cycle according to some embodiments of the present disclosure.
Figure 6B:
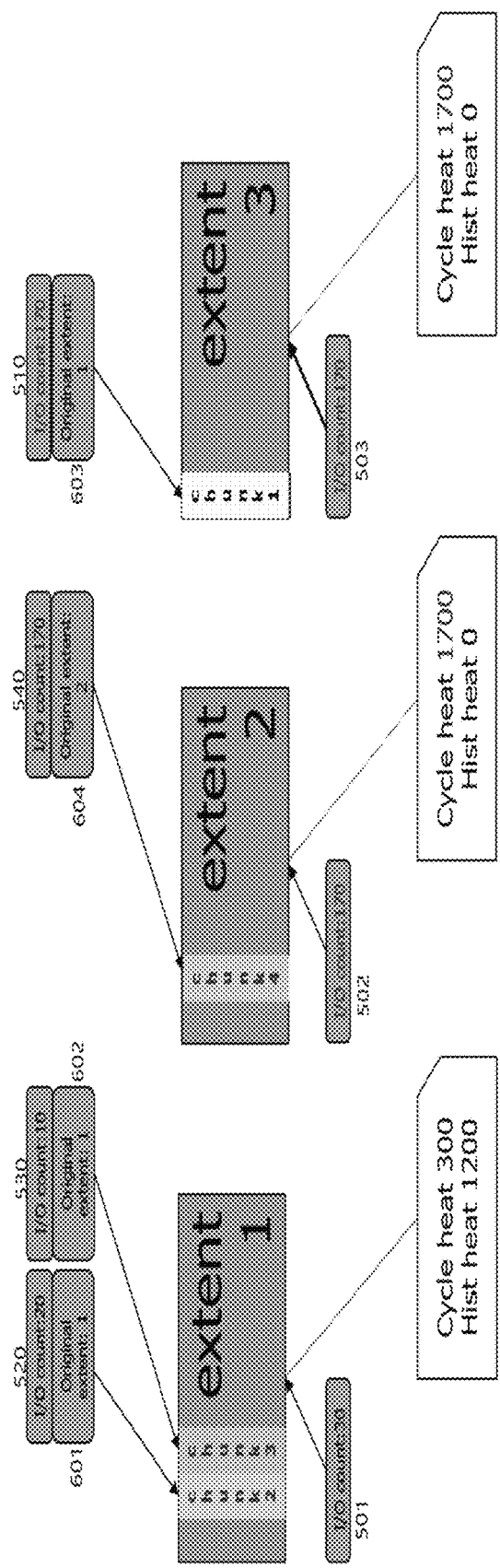

FIGS. 6A-6B show an example of multiple movements of a chunk during a cycle according to some embodiments of the present disclosure. FIGS. 6A-6B can be also used to explain how to adjust historical heat of extents. To adjust historical heat, a field called "original extent" can be added to the metadata of the chunks. This field can be used to record from which extent the heat was moved, if it was moved from another extent to the current extent. This field can be set to an ID of the extent where a chunk is located at the start of a cycle.

The example of FIGS. 6A-6B is a continuation from the example in FIGS. 5A-5B. For the purposes of the following discussion, it is assumed that FIGS. 5A-5B and 6A-6B represent four moments, t1-t4 of a cycle. More specifically, FIG. 5A represents moment t1, FIG. 5B represents moment t2, FIG. 6A represents moment t3, and FIG. 6B represents moment t4. Further, with reference to FIGS. 5A-5B and FIGS. 6A-6B, it can be assumed that the field of "original extent" is added to the metadata of each chunk (though it is not shown in FIGS. 5A-5B), at moment t1, the fields "original extent" 601, 602 and 603 are set to 1 since chunks 1-3 are originally located in extent 1, and the field "original extent" 604 is set to 2 since chunk 4 is originally located in extent 2.

As shown in FIG. 5B, at moment t2, chunk 1 is moved from extent 1 to extent 2. As described above, due to this movement, a cycle heat value of 700 associated with chunk 1 is moved from extent 1 to extent 2, and the number of access operations corresponding to chunk 1 is also moved from the field "I/O count" 501 to the field "I/O count" 502. Further, during time from t2 to t3, 100 more access operations to chunk 1 and 170 access operations to chunk 4 are monitored. Thus, with reference to FIG. 6A, at moment t3, these values are recorded in the fields "I/O count" 510 and 540, respectively. Thus, the "I/O count" 502 for extent 2 amounts to 340 that is equal to sum of the number of access operations to chunk 1 and chunk 4. Accordingly, the cycle heat of extent 2 rises to 3400.

As shown in FIG. 6B, chunk 1 is moved from extent 2 to extent 3. That is to say, in the same cycle, even multiple movements of a chunk can be processed in the same way. With the movement of chunk 1 from extent 2 to extent 3, the cycle heat in a corresponding ratio of extent 2 (i.e., 3400* (170/340)=1700) is moved to extent 3, and the field "I/O count" 502 for extent 2 is decreased by the number of access operations to chunk 1 (i.e., 170) and the field "I/O count" 503 for extent 3 is increased by 170. In this case, even if chunk 1 is moved from extent 2 to extent 3, its field of "original extent" does not change and still has a value of "1" since it only indicates its original extent at the start of this cycle.

In the example of FIG. 6B, it is assumed that at moment t4, the cycle ends. At this time, the historical heat of extents can be adjusted according to some embodiments of the disclosure. In this example of FIG. 6B, it is assumed that the historical heat (denoted as "Hist heat" in FIG. 6B) of extents 1-3 are 1200, 0 and 0 respectively as shown in FIG. 6B. Since at the end of the cycle, chunk 1 originally located in extent 1 has been moved to extent 3, historical heat in a corresponding ratio of extent 1 can be moved to extent 3. As described above, (heat to be moved)/(historical heat of extent 1)=(I/O count of chunk 1)/((I/O count of chunk 1)+(I/O count of extent 1)). That is, heat to be moved=1200* (170/(170+30))=1020. As a result, the historical heat of extent 1 can be adjusted to (1200-1020)=180, and the historical heat of extent 3 can be adjusted to (0+1020)=1020. For each of chunks that are not in extent 1 but having a value of "original extent" equal to 1, the above operation can be performed. After the chunks moved out of extent 1 are considered, a final historical heat of extent 1 can be determined. Additionally, for each extent, historical heat can be calculated in the same way.

In the above embodiment, a field of "original extent" is introduced and added to metadata of each chunk. In another embodiment, instead of adding the field of "original extent," a mapping can be maintained to look up a chunk that moved and its original extent by IDs. Since only those chunks moved in one cycle are recorded in a mapping, this number can be less than the total number of chunks in the data store. A look up failure for a chunk ID in the mapping indicates that there is no movement for this chunk in this cycle. As the amount of moved chunk during a cycle can be a relatively small portion of all trunks, this variation can reduce memory used for metadata significantly.

In some embodiments of the disclosure, the access operation can include at least one of a read operation and a write operation. That is, in some embodiments of the disclosure, both a read operation and write operation can be counted as an access operation that will cause "I/O count" to increase by 1. In another embodiment of the disclosure, only read operations are counted to reflect a read heat, or only write operations are counted to reflect a write heat.

In some embodiments, for example, the metadata on a chunk may use 64 bits for "I/O count" and 32 bits for "original extent," that is, 12 bytes in total per chunk. There can also be one field on the extent level, but since the number of extents can be less than the number of chunks, it may not contribute much memory footprint. Comparing with the straightforward method that records heat values in granularity of chunks, the heat data per chunk is larger than 12 bytes. In some scenarios, the heat data per chunk can contain 8 fields, each of the fields is a value with 64 bits, thus the heat data has 64 bytes in total per chunk. In such a scenario, the memory saving is more than 80%.

According to some embodiments, in environments where data is moved in a second level lower than a first level for which heat values are recorded, heat values are tracked so that heat at the first level are more valid and effective, at the cost of relatively small amount of memory and CPU resources.

The present disclosure can be a system, a method, and/or a computer program product at any possible technical detail level of integration. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for tracking heat values, the method comprising:
    monitoring a first number of access operations to first data in each of a plurality of first source storage units during a cycle;
    for each of the plurality of first source storage units, calculating a first heat value based on the first number of access operations;
    in response to source data being moved from one of the first source storage units to a first target storage unit during the cycle, decreasing a calculated heat value of the one first source storage unit by a first value and increasing a calculated heat value of the first target storage unit by the first value, wherein a ratio of the first value to the calculated heat value of the one first source storage unit is equal to a ratio of a monitored number of access operations to the source data to the first number of access operations; and
    in response to the source data being moved from the one first source storage unit to the first target storage unit during the cycle, decreasing the first number of access operations by a number that is equal to the monitored number of access operations to the source data, and increasing a monitored number of access operations to data in the first target storage unit by the number.

2. The method according to claim 1, wherein the source data is moved from the one first source storage unit to the first target storage unit in one of a plurality of second storage units that is smaller than the one first source storage unit.

3. The method according to claim 2, wherein the one first source storage unit is an extent and the one second storage unit is a chunk.

4. The method according to claim 2, further comprising monitoring a second number of access operations to second data in each of the second storage units for each of the first source storage units during the cycle.

5. The method according to claim 4, further comprising, at the end of the cycle:
    decreasing a stored historical heat value of the one first source storage unit by a second value and increasing a stored historical heat value of the first target storage unit by the second value, wherein a ratio of the second value to the stored historical heat value of the one first source storage unit is equal to a ratio of a monitored number of access operations to the source data to a sum of the first number of access operations and a monitored number of access operations to the source data.

6. The method according to claim 1, wherein respective access operations are selected from a group consisting of: a read operation, and a write operation.

7. A system for tracking heat values, the system comprising:
- one or more processors;
- a memory coupled to at least one of the one or more processors;
- a set of computer program instructions stored in the memory and executed by at least one of the one or more processors in order to perform a method comprising:
  - monitoring a first number of access operations to first data in each of a plurality of first source storage units during a cycle;
  - for each of the plurality of first source storage units, calculating a first heat value based on the first number of access operations;
  - in response to source data being moved from one of the first source storage units to a first target storage unit during the cycle, decreasing a calculated heat value of the one first source storage unit by a first value and increasing a calculated heat value of the first target storage unit by the first value, wherein a ratio of the first value to the calculated heat value of the one first source storage unit is equal to a ratio of a monitored number of access operations to the source data to the first number of access operations; and
  - in response to the source data being moved from the one first source storage unit to the first target storage unit during the cycle, decreasing the first number of access operations by a number that is equal to the monitored number of access operations to the source data, and increasing a monitored number of access operations to data in the first target storage unit by the number.

8. The system according to claim 7, wherein the source data is moved from the one first source storage unit to the first target storage unit in one of a plurality of second storage units that is smaller than the one first source storage unit.

9. The system according to claim 8, wherein the one first storage unit is an extent and the one second storage unit is a chunk.

10. The system according to claim 8, further comprising a set of computer program instructions stored in the memory and executed by at least one of the one or more processors in order to perform monitoring of a second number of access operations to second data in each of the second storage units for each of the first source storage units during the cycle.

11. The system according to claim 10, further comprising a set of computer program instructions stored in the memory and executed by at least one of the one or more processors in order to perform:
- decreasing a stored historical heat value of the one first source storage unit by a second value and increasing a stored historical heat value of the first target storage unit by the second value, wherein a ratio of the second value to the stored historical heat value of the one first source storage unit is equal to a ratio of a monitored number of access operations to the source data to a sum of the first number of access operations and a monitored number of access operations to the source data.

12. The system according to claim 7, wherein respective access operations are selected from a group consisting of: a read operation, and a write operation.

13. A computer program product for tracking heat values, the computer program product comprising a computer readable storage medium having program instructions embodied therewith, wherein the program instructions being executable by a device to cause the device to perform a method comprising:
- monitoring a first number of access operations to first data in each of a plurality of first source storage units during a cycle;
- for each of the plurality of first source storage units, calculating a first heat value based on the first number of access operations;
- in response to source data being moved from one of the first source storage units to a first target storage unit during the cycle, decreasing a calculated heat value of the one first source storage unit by a first value and increasing a calculated heat value of the first target storage unit by the first value, wherein a ratio of the first value to the calculated heat value of the one first source storage unit is equal to a ratio of a monitored number of access operations to the source data to the first number of access operations; and
- in response to the source data being moved from the one first source storage unit to the first target storage unit during the cycle, decreasing the first number of access operations by a number that is equal to the monitored number of access operations to the source data, and increasing a monitored number of access operations to data in the first target storage unit by the number.

14. The computer program product according to claim 13, wherein the source data is moved from the one first source storage unit to the first target storage unit in one of a plurality of second storage units that is smaller than the one first source storage unit.

15. The computer program product according to claim 14, wherein the method further comprises
- monitoring of a second number of access operations to second data in each of the second storage units for each of the first source storage units during the cycle.

16. The computer program product according to claim 15, wherein the method further comprising, at the end of the cycle:
- decreasing a stored historical heat value of the one first source storage unit by a second value and increasing a stored historical heat value of the first target storage unit by the second value, wherein a ratio of the second value to the stored historical heat value of the one first source storage unit is equal to a ratio of a monitored number of access operations to the source data to a sum of the first number of access operations and a monitored number of access operations to the source data.

17. The computer program product according to claim 13, wherein respective access operations are selected from a group consisting of: a read operation, and a write operation.

* * * * *